US011780763B2

(12) United States Patent
Bauerschmidt et al.

(10) Patent No.: US 11,780,763 B2
(45) Date of Patent: Oct. 10, 2023

(54) DEVICE AND METHOD FOR CONNECTING A FIBER PREFORM TO A PRESSURE SUPPLY SYSTEM

(71) Applicant: ASML NETHERLANDS B.V., Veldhoven (NL)

(72) Inventors: Sebastian Thomas Bauerschmidt, Wendelstein (DE); Mingli Niu, Veldhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 548 days.

(21) Appl. No.: 17/096,278

(22) Filed: Nov. 12, 2020

(65) Prior Publication Data

US 2021/0163338 A1    Jun. 3, 2021

(30) Foreign Application Priority Data

Dec. 3, 2019  (EP) .................................... 19213094

(51) Int. Cl.
    *C03B 37/027*    (2006.01)
(52) U.S. Cl.
    CPC .. *C03B 37/02736* (2013.01); *C03B 37/02781* (2013.01); *C03B 2203/16* (2013.01); *C03B 2203/42* (2013.01)
(58) Field of Classification Search
    CPC ........ C03B 37/02736; C03B 37/02781; C03B 2203/16; C03B 2203/42
    See application file for complete search history.

(56) References Cited

U.S. PATENT DOCUMENTS 4,159,200 A * 6/1979 Shono ................. C03B 37/0213
                                                    65/513
4,257,797 A * 3/1981 Andrejco .............. C03B 37/018
                                                    65/60.8
(Continued)

FOREIGN PATENT DOCUMENTS

CN    101426743    5/2009
CN    106495464    3/2017
(Continued)

OTHER PUBLICATIONS

Taiwanese Office Action issued in corresponding Taiwanese Patent Application No. 109140022, dated Oct. 12, 2021.
(Continued)

*Primary Examiner* — Jason L Vaughan
(74) *Attorney, Agent, or Firm* — Pillsbury Winthrop Shaw Pittman, LLP

(57) ABSTRACT

A device for connecting a fiber preform including a plurality of elongate holes extending substantially parallel to a longitudinal axis of the fiber preform to a pressure supply system, the device including a first surface to be connected to an end face of the fiber preform where the plurality of elongate holes end, a second surface including at least two ports configured to be in fluid connection with the pressure supply system, and a channel system within the device connecting the plurality of elongate holes at the first surface to the at least two ports, wherein a density of the at least two ports at the second surface is smaller than a density of the plurality of corresponding elongate holes at the first surface.

20 Claims, 3 Drawing Sheets

(56) References Cited

U.S. PATENT DOCUMENTS

| | | | |
|---|---|---|---|
| 5,974,838 A * | 11/1999 | Uhm | C03B 37/029 65/379 |
| 7,793,521 B2 | 9/2010 | Gallagher et al. | |
| 8,033,142 B2 * | 10/2011 | Pedrido | C03B 37/01248 65/412 |
| 8,074,474 B2 * | 12/2011 | Filippov | C03B 37/02718 65/435 |
| 8,215,129 B2 * | 7/2012 | Russell | C03B 37/02781 65/393 |
| 10,370,280 B2 * | 8/2019 | Gibson | B29C 48/32 |
| 2003/0230118 A1 | 12/2003 | Dawes et al. | |
| 2006/0104582 A1 * | 5/2006 | Frampton | C03B 37/0122 385/125 |
| 2011/0121474 A1 | 5/2011 | Russell et al. | |
| 2018/0113257 A1 | 4/2018 | Lu et al. | |
| 2018/0339931 A1 | 11/2018 | Simonsen et al. | |
| 2019/0135679 A1 | 5/2019 | Jakobsen et al. | |

FOREIGN PATENT DOCUMENTS

| | | |
|---|---|---|
| CN | 107209323 | 9/2017 |
| CN | 108349779 | 7/2018 |
| EP | 3136143 | 3/2017 |
| TW | 201643489 | 12/2016 |

OTHER PUBLICATIONS

European Search Report issued in corresponding European Patent Application No. 19213094, dated May 13, 2020.

* cited by examiner

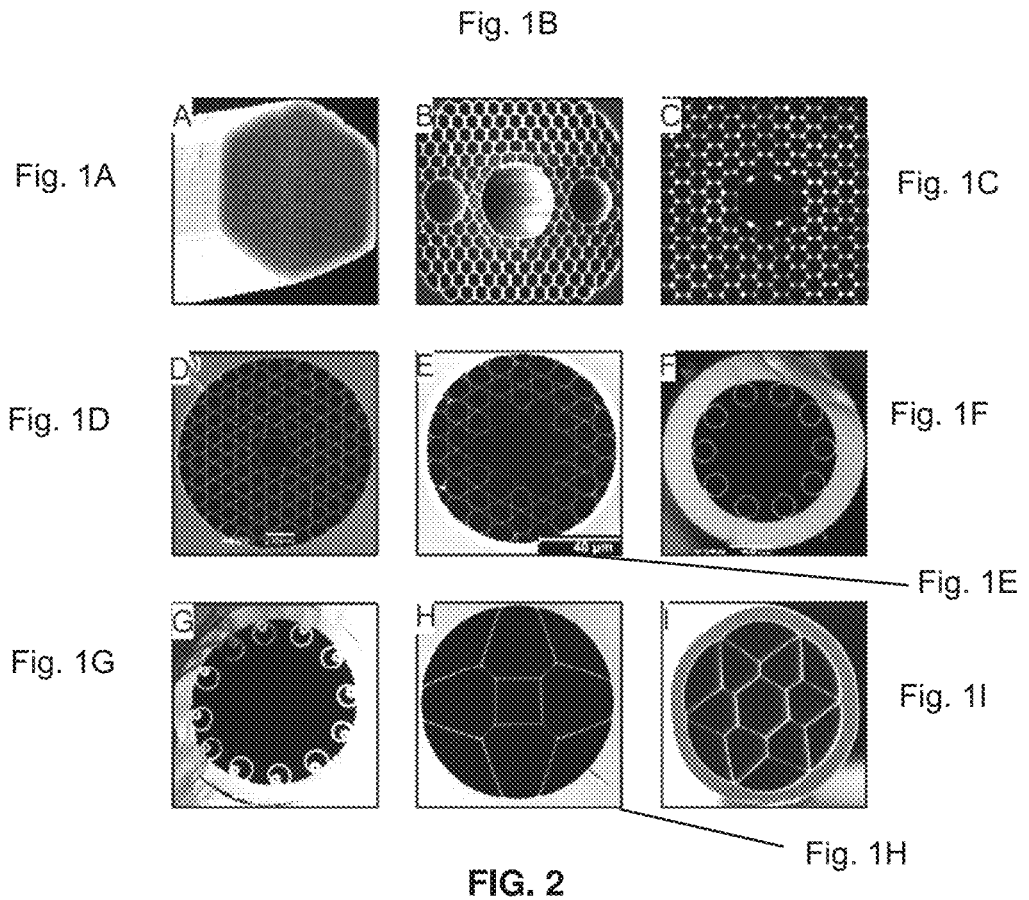
Fig. 1A Fig. 1B Fig. 1C
Fig. 1D Fig. 1E Fig. 1F
Fig. 1G Fig. 1H Fig. 1I
FIG. 2
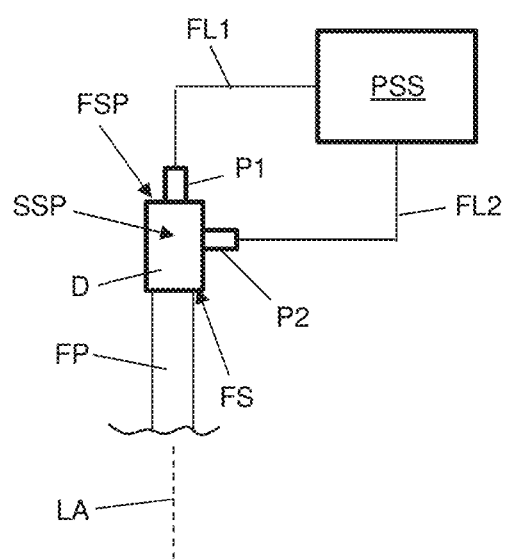

DEVICE AND METHOD FOR CONNECTING A FIBER PREFORM TO A PRESSURE SUPPLY SYSTEM

This application claims the benefit of priority to European patent application no. 19213094.6, filed Dec. 3, 2019, which is incorporated herein in its entirety by reference.

FIELD

The present description relates to a device and method for connecting a fiber preform including a plurality of elongate holes extending substantially parallel to a longitudinal axis of the fiber preform to a pressure supply system.

BACKGROUND

Solid-core fibers are generally known and broadly used e.g. in data communication applications. Solid-core fibers can be designed for low-loss, single-mode transmission in a broadband transmission range of the fiber material, like quartz glass. So-called endlessly single-mode guidance (ESM, i.e. all higher order modes (HOMs) are leaky while the fundamental $LP_{01}$ mode is fully confined) is achieved in solid-core photonic crystal fibers (PCFs) by engineering a cladding structure surrounding the solid-core, as shown in FIG. 1A, such that the diameter d of channels in the cladding structure and their center-center spacing (pitch) $\wedge$ fulfils the geometrical condition $d//\wedge<0.41$.

SUMMARY

However, due to radiation guiding in the solid fiber material, disadvantages exist in terms of increased latency in data transmission, optically non-linear effects resulting in new radiation frequencies, and relatively low damage thresholds.

Through their ability to guide radiation in a non-solid core region, which is evacuated (vacuum core), filled with a gas or filled with a liquid, hollow-core photonic crystal fibers (HC-PCFs) can have one or more unique advantages compared to solid-core fibers, resulting in application areas such as low-latency data transmission, high-power beam delivery, gas-based nonlinear optics, radiation guiding with ultralow nonlinearities and/or chemical sensing. HC-PCFs are typically divided into two classes depending on the physical guidance mechanism: hollow-core photonic bandgap fibers (HC-PBFs) and hollow-core anti-resonant-reflecting fibers (HC-AFs).

FIGS. 1B to 1I show a selection of scanning electron micrographs of different types of HC-PCFs. FIGS. 1B and 1C show HC-PBFs that confine modes inside a central hollow core by means of a photonic bandgap in the cladding. These types of PCF typically have relatively low loss (ca.<20 dB/km) at telecommunication wavelengths. However, due to the wavelength-specific effect of the photonic bandgap, they guide radiation over a relatively narrow bandwidth (ca.<15 THz) only. Although in general HC-PBFs support HOMs, it has been shown that bended HC-PBFs can be made effectively single-mode by including "satellite" hollow cores in the cladding (FIG. 1B). These satellites strongly suppress HOMs in the core by phase-matching to them, causing high HOM loss. HC-PBFs can also be made truly single-mode over a narrow spectral range (ca.<7 THz) if a small enough core is used (see FIG. 1C), but this results in fabrication difficulties and significantly higher loss for the desired fundamental mode.

FIGS. 1D to 1I show a selection of HC-AF structures, i.e. fibers having guidance mechanism based mostly on anti-resonant effects. FIGS. 1D and 1E have a Kagome-lattice cladding and FIGS. 1F and 1G have one ring of single (FIG. 1F) or nested (FIG. 1G) anti-resonant elements (AREs). FIG. 1H shows a HC-AF with a square core and FIG. 1I depicts a HC-AF with guiding properties in the ultraviolet. Compared to HC-PBFs, the loss of HC-AFs is in general larger because of the non-ideal confinement, but the transmission window is broader.

HC-PCFs can be fabricated from glass preforms in a fiber drawing process. The transverse structure of these preforms resembles that of the final fiber material, i.e. a plurality of elongate holes extending substantially parallel to a longitudinal axis of the fiber preform in a well-defined pattern. During the drawing process, the transverse structure is scaled down from the original preform cross-sectional dimension (e.g., diameter), typically a few millimeters, to the cross-sectional dimension (e.g., diameter) of the optical fiber, typically 100 to 500 micrometers. To prevent the elongate holes from collapsing during the fiber drawing process, they are pressurized, as for instance disclosed in European patent application publication nol. EP 3 136 143, incorporated herein in its entirety by reference.

A drawback of a drawing process is that connecting the plurality of elongate holes to a pressure supply system can be a complicated and time intensive process Considering the above, it is an object to, for example, provide a device and method for connecting a fiber preform to a pressure supply system in an easy and quick manner.

According to an embodiment, there is provided a device for connecting a fiber preform including a plurality of elongate holes extending substantially parallel to a longitudinal axis of the fiber preform to a pressure supply system, the device comprising:

a first surface to be connected to an end face of the fiber preform where the plurality of elongate holes end;

a second surface comprising at least two ports configured to be in fluid connection with the pressure supply system; and a channel system within the device and comprising channels connecting the plurality of elongate holes at the first surface to the at least two ports such that at least one of the plurality of elongate holes is connected to one of the at least two ports and such that at least one other of the plurality of elongate holes is connected to another one of the at least two ports, wherein a density of the at least two ports at the second surface is smaller than a corresponding density of the channel system at the first surface.

By providing a device with an integrated channel system and a first surface to be connected to an end face of the fiber preform, complex structures of the fiber preform, such disclosed in U.S. patent application publication no. US 2011/0121474 (which is incorporated herein in its entirety by reference) where tubes having different lengths extending from the end face are used, and time intensive operations such as connecting pressure tubes to the elongate holes, such as disclosed in U.S. patent application publication no. US 2019/0135679 A1 (which is incorporated herein in its entirety by reference), can be avoided. The density of the at least two ports at the second surface being smaller than a corresponding density of the elongate holes of the channel system at the first surface has an advantage that more space is provided at the second surface for connecting the at least two ports to the pressure supply system and, for instance, conventional connectors may be used. The density is defined as the number of ports or holes per unit area of a surface. In the embodiment the channel system is configured such that a total number of ports at the second surface is distributed across a larger area than the area to which their corresponding elongate holes are confined.

In an embodiment, the second surface includes a first surface portion substantially opposite the first surface and a second surface portion extending substantially non-parallel to the first surface, and wherein at least one port is arranged at the first surface portion of the second surface and at least one other port is arranged at the second surface portion of the second surface. This may provide more space between the at least two ports as the ports are arranged at surface portions that extend in different directions and thus have a different orientation.

In an embodiment, the end face of the fiber preform has a circular shape with a center and a radius, wherein the device has a longitudinal axis to coincide with the center of the fiber preform, wherein the second surface includes a first surface portion substantially opposite the first surface and a second surface portion extending substantially perpendicular to the first surface, and wherein at least one port is arranged at the second surface portion of the second surface at a distance from the longitudinal axis of the device that is larger than the radius of the fiber preform.

In an embodiment, the fiber preform has a radius in the range of a few millimeters. By arranging the second surface portion at a larger distance from the longitudinal axis of the device than the radius of the fiber preform, more space can be made available for connecting ports to the pressure supply system.

In an embodiment, the device has a cylindrical shape with the first surface being an end surface of the cylindrical shape, wherein the second surface includes a first surface portion being an end surface of the cylindrical shape opposite the first surface and a second surface portion being a side surface of the cylindrical shape. Desirably, the cylindrical shape corresponds to a right circular cylinder or a right elliptic cylinder.

In an embodiment, the first surface is provided with one or more nozzles to mate with corresponding tubular elements in the fiber preform forming elongate holes. An advantage of nozzles may be that sealing between an elongate hole and the channel system is improved and/or that the mechanical robustness is improved and/or that the alignment process between first surface of the device and the end face of the fiber preform is simplified.

In an embodiment, the channel system at a distance from the first surface occupies a cross-sectional area that is larger than a cross-sectional area occupied by the channel system at the first surface. Such a diverging channel system allows to easily create additional space for connecting the at least two ports to the pressure supply system.

In an embodiment, the device includes an assembly of device portions separately fabricated and assembled together to form the device. This is for instance advantageous when a relatively complex channel system is desired or required while making use of relatively easy fabrication processes as the device portions may be easily fabricated while the complexity is obtained after assembly.

In an embodiment, the device includes a stack of at least three device portions extending from the first surface containing the channel system including a bottom device portion, a top device portion and at least one intermediate device portion, wherein an intermediate device portion has one or more of the following features:

a. a port at a side surface of the intermediate device portion;
b. one or more unbranched channels extending through the intermediate device portion;
c. channels that are combined into a single channel;
d. one or more channels that are tapered or otherwise having a changing cross-section, e.g. such that a size of a cross-section of the one or more channels increases towards a top device portion side of the intermediate device portion, and wherein the bottom device portion includes the first surface.

The above feature a. allows for an easy to fabricate port at a side surface of the device by incorporating the port in an intermediate device portion. Such a port may for instance be fabricated as an opening extending over the entire height of the intermediate device that is delimited at the bottom and top side by the adjacent device portions.

The above feature c. allows channels that need to be pressurized with the same pressure to be combined to reduce the number of ports necessary to connect the fiber preform to the pressure supply system.

The above feature d. allows, for instance, to increase the cross-section of the channels to match the size of a port or connection to the pressure supply system.

In an embodiment, the top device portion includes a port arranged at a side surface of the top device portion and/or a port arranged at a surface facing away from the at least one intermediate device portion.

According to an embodiment, there is provided a set of device portions configured to form two different configurations of a device as described herein, wherein at least one device portion is used in both configurations, wherein the two configurations may allow two different fiber preforms to be connected to the same pressure supply system or may allow two identical fiber preforms to be connected to a pressure supply system in a different way. This allows to reuse the device or at least parts thereof for other fiber preforms or other pressure supply systems, or to pressurize a fiber preform in another way.

According to an embodiment, there is provided a method for connecting a fiber preform including a plurality of elongate holes extending substantially parallel to a longitudinal axis of the fiber preform to a pressure supply system, the method comprising:

a. attaching an end face of the fiber preform, where the plurality of elongate holes end, to a first surface of a device as described herein; and
b. connecting the at least two ports of the device to the pressure supply system.

In an embodiment, the end face of the fiber preform is attached to the first surface of the device using a sealant to provide a substantially gas-tight connection between elongate holes in the fiber preform and the channel system of the device.

In an embodiment, the method comprises:
i. prior to step a., inserting a temporary blocking member into one or more elongate holes in the fiber preform, which temporary blocking member is configured to prevent blocking of a passage between the corresponding elongate hole and the channel system of the device during step a.; and
ii. during or after step a., removing the temporary blocking member.

In an embodiment, the device includes an assembly of device portions separately fabricated and assembled together to form the device, wherein step a. includes attaching the end face of the fiber preform to a device portion including the first surface, and wherein step ii. is carried out through the device portion including the first surface and before other device portions are connected to the device portion including the first surface.

In an embodiment, the device is separated from a previously drawn fiber preform prior to step a.

BRIEF DESCRIPTION OF THE DRAWINGS

Embodiments of the invention will now be described, by way of example only, with reference to the accompanying schematic drawings, in which:

FIGS. 1A-1I depict cross-sections of solid or hollow core fibers;

FIG. 2 schematically depicts a connection between a fiber preform and a pressure supply system;

DETAILED DESCRIPTION

FIG. 2 schematically depicts a fiber preform FP including a plurality of elongate holes extending substantially parallel to a longitudinal axis LA for instance similar to any of the shown examples of FIGS. 1B to 1I. The plurality of elongate holes end at an end face of the preform FP such as shown in FIGS. 1B to 1I.

FIG. 2 schematically depicts how the fiber preform FP is connected to a pressure supply system PSS. To this end a device D is provided according to an embodiment of the invention, examples of which will be explained below in more detail. The device D includes a first surface FS connected to an end face of the fiber preform FP where the plurality of elongate holes end, and a second surface including a first surface portion FSP substantially opposite the first surface FS and a second surface portion SSP extending between the first surface FS and the first surface portion FSP.

Arranged at the first surface portion FSP is a first port P1 connected to the pressure supply system PSS via a first fluid communication line FL1. Arranged at the second surface portion SSP is a second port P2 connected to the pressure supply system PSS via a second fluid communication line FL2. At least one of the plurality of elongate holes of the fiber preform FP is connected to the first port P1 while at least one other of the plurality of elongate holes is connected to the second port P2 via a channel system within the device D examples of which will be explained below in more detail. As a result of the channel system, the two ports P1, P2 and the two fluid communication lines FL1, FL2, it is possible to use the pressure supply system to provide different pressures to different elongate holes.

According to an embodiment, the density of the two ports P1, P2 at the second surface is smaller than a corresponding density of the channel system at the first surface as will be explained below in more detail. The density is defined as the number of channels passing through a unit area of a surface. A first density may be related to the number of channels within the channel system per unit area connecting holes at the first surface FS and a second density may be related to the number of ports, connected to its corresponding elongate hole(s) per unit area at the second surface portion SSP.

Exemplary embodiments of the device D suitable to be used in the embodiment of FIG. 2 will be described by reference to the FIGS. 3-5.

Figure 3:
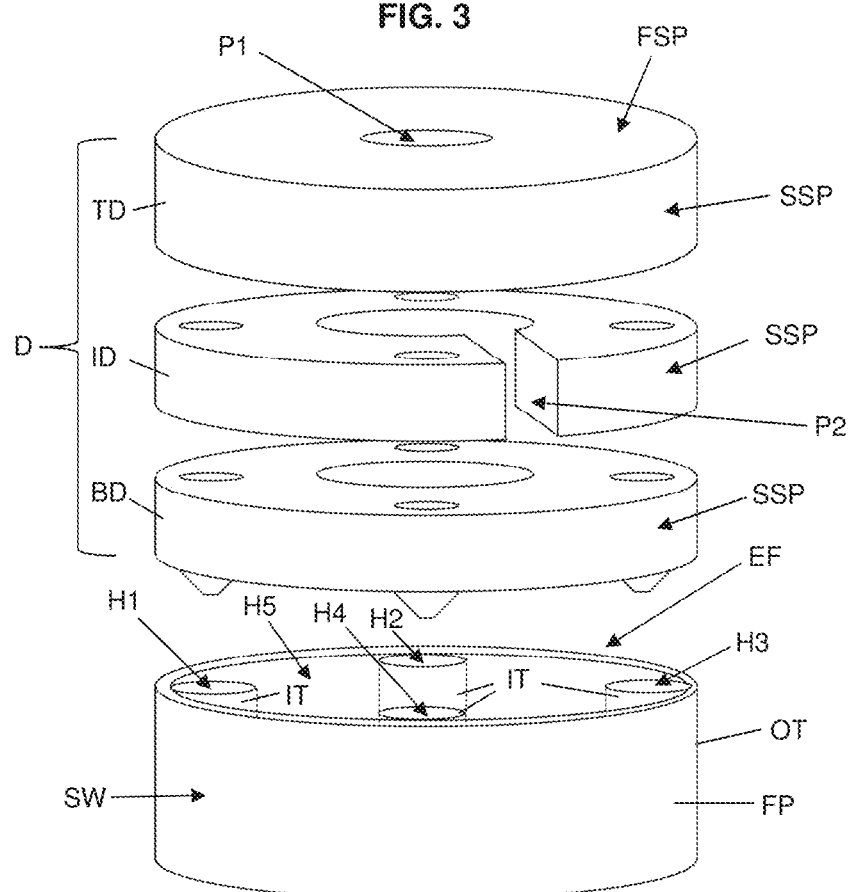
FIG. 3 schematically depicts an exploded view of a device according to an embodiment of the invention and a fiber preform.
Figure 4:
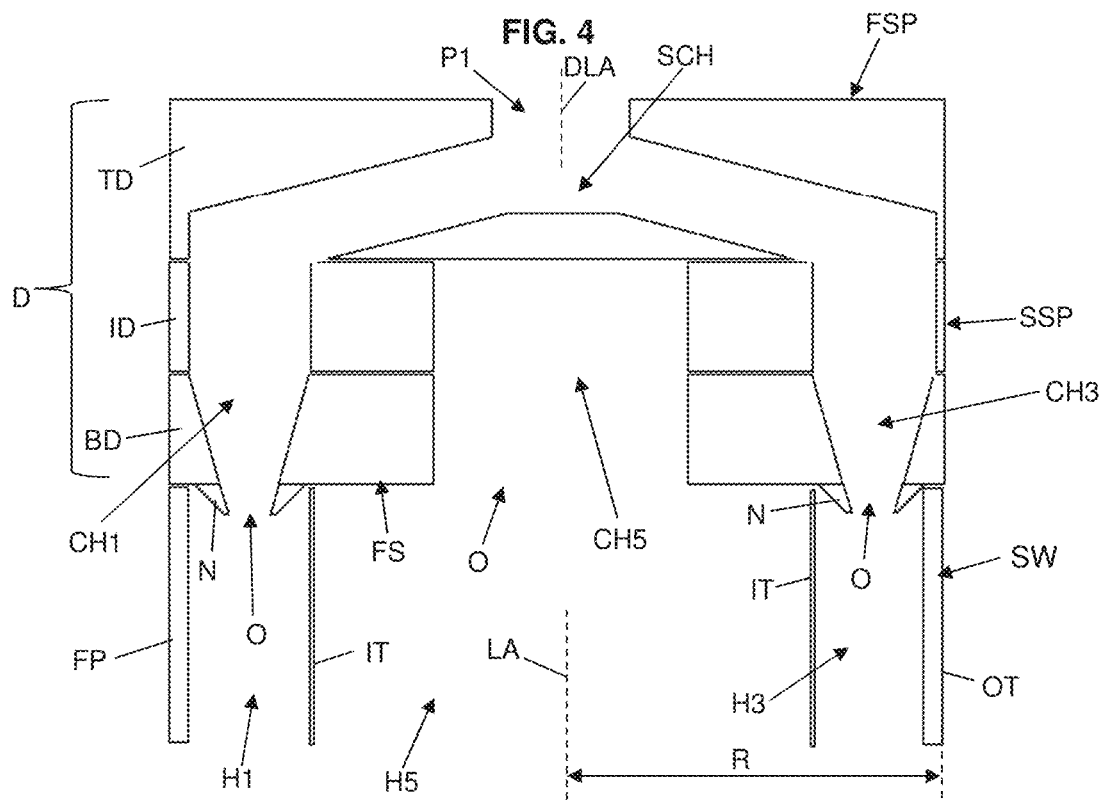
FIG. 4 schematically depicts a cross-sectional view of the device of FIG. 3.

FIGS. 3 and 4 schematically depict an exploded view and a cross-sectional view of a device D according to an embodiment of the invention and a fiber preform FP, respectively. The fiber preform FP is schematically depicted as an outer tube OT encompassing four smaller inner tubes IT. As a result thereof, the preform FP includes, in this example, five elongate holes H1-H5, namely four elongate holes H1-H4 corresponding to the four inner tubes IT, respectively, and the elongate hole H5 corresponding to the space inside the outer tube OT in between the four inner tubes IT.

The fiber preform FP has a cylindrical shape, at least near the device D, defined by a side wall SW of the outer tube OT and delimited at one end by an end face EF, which end face EF is also a face where the elongate holes H1-H5 end. The end face EF thus has a circular shape with a center coinciding with a longitudinal axis LA of the preform FP and a radius R.

The end face EF of the preform FP is connected to the device D. As can be clearly seen in the exploded view of FIG. 3, the device D includes a bottom device portion BD, an intermediate device portion ID, and a top device portion TD. The device D has a cylindrical shape with a longitudinal axis DLA, so that the device portions BD, ID, TD form cylindrically shaped segments stacked upon each other to form the device D.

The bottom device portion BD includes a first surface FS connected to the end face EF of the fiber preform FP, e.g. using a sealant to provide a substantially gas-tight connection. The top device portion TD includes a first surface portion FSP opposite to the first surface FS, which first surface portion FSP is part of a second surface of the device D. The device portions BD, ID, TD all include a portion of a second surface portion SSP extending between the first surface SP at the bottom device portion BD and the first surface portion FSP and being part of the second surface of the device D.

The second surface of the device D comprises a first port P1 and a second port P2 to connect the device D to a pressure supply system. In this embodiment, the first port P1 is arranged at the first surface portion FSP and the second port P2 is arranged at the second surface portion SSP.

The first surface FS of the device D includes an opening O per elongate hole H1-H5, which five openings O are connected to the first port P1 or the second port P2 via five corresponding channels of a channel system of which only the channels CH1, CH3 and CH5 are visible in FIG. 4.

The openings O associated with the inner tubes IT are in this embodiment provided with nozzles N to make alignment with the holes H1-H4 easy and to provide a gas-tight connection. The corresponding channels CH1, CH3, extend from the bottom device portion BD through the intermediate device portion ID to the top device portion TD to be combined into a single channel SCH connected to the first port P1. The channel CH5 extends from the bottom device portion BD to the intermediate device portion ID where it is connected to the second port P2. Hence, as a result, by applying different pressures to the first and second ports P1, P2, the pressure in the inner tubes IT can be different from the pressure in the hole H5.

It will be clear to the skilled person that a distance between the first port P1 and the second port P2 at the second surface of the device D can be larger than a distance between the openings O at the first surface FS of the device D. In other words, by having a density of the ports at the second surface that is smaller than a density of the channel system at the first surface FS, space is created to connect the first and second ports P1, P2 to a pressure supply system.

Figure 5:
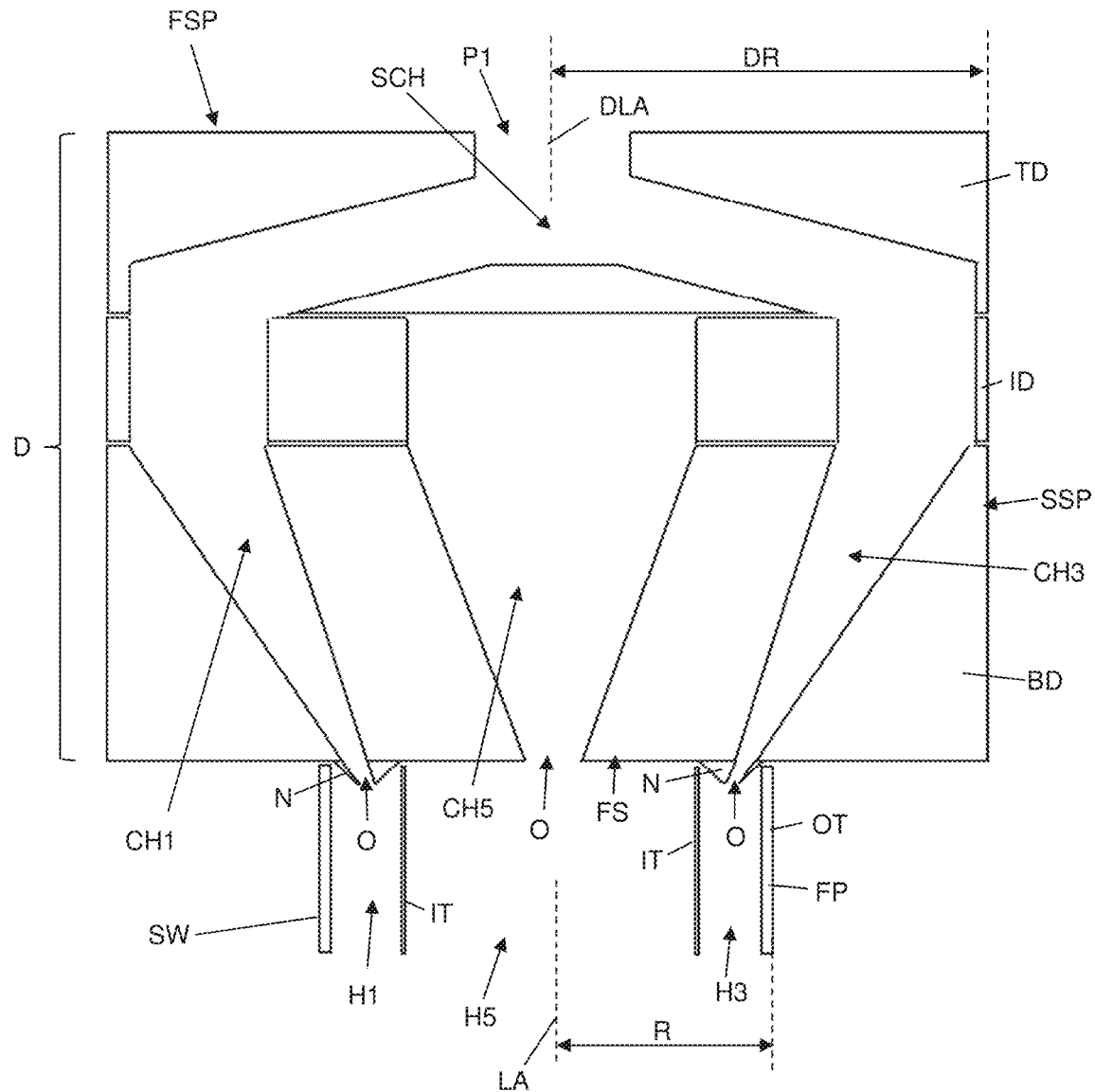
FIG. 5 schematically depicts a cross-sectional view of a device according to an embodiment of the invention.

FIG. 5 depicts a cross-sectional view of a device D according to a further embodiment of the invention connected to the same fiber preform FP as in the embodiment of FIGS. 3 and 4. To avoid undue repetition, similar reference symbols are used to indicate similar parts of the device D and the description below focuses on the differences between the two embodiments, so that the description relating to the embodiment of FIGS. 3 and 4 also applies to the embodiment of FIG. 5 as well for the similarities.

A main difference between the shown embodiments is that the device D in FIG. 5 has a cylindrical shape with a radius DR that is larger than the radius R of the fiber preform FP. As a result thereof, more surface area at the second surface of the device D is available for ports, such as the first port P1 and the second port P2, allowing to increase the number of ports while substantially keeping the same density of ports or to increase the size of the ports or use larger connectors to connect the ports to the pressure supply system.

As the end face EF of the fiber preform FP is smaller than the first surface FS of the bottom device portion BD, the openings O of the channel system are arranged around a center of the first surface FS and do not cover the entire first surface FS. The channels CH1-CH5 of the channel system in the bottom device portion BD can diverge towards the intermediate device portion ID and/or taper outwards towards the intermediate device portion ID, so that a size of a cross-section of the one or more channels CH1-CH5 increases towards a top device portion side of the bottom device portion BD. The intermediate device portion ID and the top device portion TD have a similar construction compared to the embodiment of FIGS. 3 and 4, but with increased dimensions.

Although the above embodiments have been described with a limited number of elongate holes in the fiber preform, a limited number of ports, and a limited number of device portions to keep the examples simple and easy to understand, it will be clear for the skilled person that any practical number of elongate holes, e.g. as shown in the examples of FIGS. 1B-1I, in the fiber preform, any practical number of ports, depending on the pressure requirements during the drawing process, and any practical number of device portions, if necessary, can be used.

Although the above embodiments describe the device D as being modular and being made of a plurality of device portions, it is possible to use a single component device D as well. Such a device D can for instance be manufactured using 3D printing techniques.

The features of the invention disclosed in the above description, the drawings and the claims can be of significance individually, in combination or sub-combination for the implementation of the invention in its different embodiments.

Further embodiments of the invention are disclosed in the list of numbered clauses below:
1. A device for connecting a fiber preform including a plurality of elongate holes extending substantially parallel to a longitudinal axis of the fiber preform to a pressure supply system, the device comprising:
    a first surface to be connected to an end face of the fiber preform where the plurality of elongate holes end;
    a second surface comprising at least two ports configured to be in fluid connection with the pressure supply system; and
    a channel system within the device and comprising channels connecting the plurality of elongate holes at the first surface to the at least two ports such that at least one of the plurality of elongate holes is connected to one of the at least two ports and such that at least one other of the plurality of elongate holes is connected to another one of the at least two ports,
    wherein a density of the at least two ports at the second surface is smaller than a corresponding density of the channel system holes at the first surface.
2. A device according to clause 1, wherein the second surface includes a first surface portion substantially opposite the first surface and a second surface portion extending substantially non-parallel to the first surface, and wherein at least one port is arranged at the first surface portion of the second surface and at least one other port is arranged at the second surface portion of the second surface.
3. A device according to clause 1 or clause 2, wherein the end face of the fiber preform has a circular shape with a center and a radius, wherein the device has a longitudinal axis to coincide with the center of the fiber preform, wherein the second surface includes a first surface portion substantially opposite the first surface and a second surface portion extending substantially perpendicular to the first surface, and wherein at least one port is arranged at the second surface portion of the second surface at a distance from the longitudinal axis of the device that is larger than the radius of the fiber preform.
4. A device according to any of the clauses 1-3, wherein the device has a cylindrical shape with the first surface being an end surface of the cylindrical shape, wherein the second surface includes a first surface portion being an end surface of the cylindrical shape opposite the first surface and a second surface portion being a side surface of the cylindrical shape.
5. A device according to clause 4, wherein the cylindrical shape corresponds to a right circular cylinder or a right elliptic cylinder.
6. A device according to any of clauses 1-5, wherein the first surface is provided with one or more nozzles to mate with corresponding tubular elements in the fiber preform forming elongate holes.
7. A device according to any of clauses 1-6, wherein the channel system at a distance from the first surface occupies a cross-sectional area that is larger than a cross-sectional area occupied by the channel system at the first surface.
8. A device according to any of clauses 1-7, wherein the device includes an assembly of device portions separately fabricated and assembled together to form the device.
9. A device according to clause 8, wherein the device includes a stack of at least three device portions extending from the first surface containing the channel system including a bottom device portion, a top device portion and at least one intermediate device portion, wherein an intermediate device portion has one or more of the following features:
    a port at a side surface of the intermediate device portion;
    one or more unbranched channels extending through the intermediate device portion;
    channels that are combined into a single channel; and/or one or more channels that are tapered, e.g. such that a size of a cross-section of the one or more channels increases towards a top device portion side of the intermediate device portion; and wherein the bottom device portion includes the first surface.

10. A device according to clause 9, wherein the top device portion includes a port arranged at a side surface of the top device portion and/or a port arranged at a surface facing away from the at least one intermediate device portion.

11. A set of device portions configured to form two different configurations of a device according to any of clauses 1-10, wherein at least one device portion is used in both configurations, wherein the two configurations may allow two different fiber preforms to be connected to the same pressure supply system or may allow two identical fiber preforms to be connected to a pressure supply system in a different way.

12. A method for connecting a fiber preform including a plurality of elongate holes extending substantially parallel to a longitudinal axis of the fiber preform to a pressure supply system, the method comprising the following steps:
 a. attaching an end face of the fiber preform where the plurality of elongate holes end to a first surface of a device according to any of clauses 1-10; and
 b. connecting the at least two ports to the pressure supply system.

13. A method according to clause 12, wherein the end face of the fiber preform is attached to the first surface of the device using a sealant to provide a substantially gas-tight connection between elongate holes in the fiber preform and the channel system of the device.

14. A method according to clause 12 or clause 13, further comprising:
 i. prior to step a., inserting a temporary blocking member into one or more elongate holes in the fiber preform, which temporary blocking member are configured to prevent blocking of a passage between the corresponding elongate hole and the channel system of the device during step a.; and
 ii. during or after step a., removing the temporary blocking members.

15. A method according to clause 14, wherein the device is a device according to any of clauses 8-10, wherein step a. includes the step of attaching the end face of the fiber preform to a device portion including the first surface, and wherein step ii. is carried out through the device portion including the first surface and before other device portions are connected to the device portion including the first surface.

16. A method according to any of clauses 12-15, wherein prior to step a. the device is separated from a previously drawn fiber preform.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A device for connecting a fiber preform including a plurality of elongate holes extending substantially parallel to a longitudinal axis of the fiber preform to a pressure supply system, the device comprising:
 a first surface to be connected to an end face of the fiber preform where the plurality of elongate holes end;
 a second surface comprising at least two ports configured to be in fluid connection with the pressure supply system, wherein the second surface includes a surface portion substantially opposite the first surface and at least one port of the at least two ports is arranged at the portion; and
 a channel system within the device connecting the plurality of elongate holes at the first surface to the at least two ports such that at least one of the plurality of elongate holes is connected to one of the at least two ports and such that at least one other of the plurality of elongate holes is connected to another one of the at least two ports,
 wherein a density of the at least two ports at the second surface is smaller than a corresponding density of the channel system at the first surface, the density being a number of ports or one or more openings of the channel system per unit area of a surface.

2. The device according to claim 1, wherein the second surface includes a surface portion extending substantially non-parallel to the first surface, and wherein at least one other port of the at least two ports is arranged at the portion extending substantially non-parallel to the first surface.

3. The device according to claim 1, wherein the end face of the fiber preform has a circular shape with a center and a radius, wherein the device has a longitudinal axis to coincide with the center of the fiber preform, wherein the second surface includes a surface portion extending substantially perpendicular to the first surface, and wherein at least one other port of the at least two ports is arranged at the portion extending substantially perpendicular to the first surface at a distance from the longitudinal axis of the device that is larger than the radius of the fiber preform.

4. The device according to claim 1, wherein the device has a cylindrical shape with the first surface being an end surface of the cylindrical shape, and wherein the portion is an end surface of the cylindrical shape opposite the first surface and the second surface includes a surface portion that is a side surface of the cylindrical shape.

5. The device according to claim 4, wherein the cylindrical shape corresponds to a right circular cylinder or a right elliptic cylinder.

6. The device according to claim 1, wherein the first surface has one or more nozzles to mate with corresponding tubular elements in the fiber preform forming at least some of the elongate holes.

7. The device according to claim 1, wherein the channel system at a distance from the first surface occupies a cross-sectional area that is larger than a cross-sectional area occupied by the channel system at the first surface.

8. The device according to claim 1, wherein the device includes an assembly of device portions separately fabricated and assembled together to form the device.

9. The device according to claim 8, wherein the device includes a stack of at least three device portions extending from the first surface containing the channel system including a bottom device portion having the first surface, a top device portion and at least one intermediate device portion, wherein an intermediate device portion has one or more of the following:
 a port at a side surface of the intermediate device portion;
 one or more unbranched channels extending through the intermediate device portion;
 channels that are combined into a single channel; and/or
 one or more channels that are tapered.

10. The device according to claim 9, wherein the top device portion includes a port arranged at a side surface of the top device portion and/or a port arranged at a surface facing away from the at least one intermediate device portion.

11. A set of device portions configured to form two different configurations of the device according to claim 1, wherein at least one device portion is used in both configurations, wherein the two configurations allow two different fiber preforms to be connected to the same pressure supply system or allow two identical fiber preforms to be connected to a pressure supply system in a different way.

12. A method for connecting a fiber preform including a plurality of elongate holes extending substantially parallel to a longitudinal axis of the fiber preform to a pressure supply system, the method comprising:
    attaching an end face of the fiber preform where the plurality of elongate holes end to a first surface of the device according to claim 1; and
    connecting the at least two ports to the pressure supply system.

13. The method according to claim 12, wherein the end face of the fiber preform is attached to the first surface of the device using a sealant to provide a substantially gas-tight connection between elongate holes in the fiber preform and the channel system of the device.

14. The method according to claim 12, further comprising:
    prior to the attaching the end face, inserting one or more temporary blocking members into one or more elongate holes in the fiber preform, which one or more temporary blocking members are configured to prevent blocking of a passage between the corresponding elongate hole and the channel system of the device during the attaching the end face; and
    during or after the attaching the end face, removing the one or more temporary blocking members.

15. The method according to claim 14, wherein the device includes an assembly of device portions separately fabricated and assembled together to form the device, and the attaching the end face includes attaching the end face of the fiber preform to a device portion of the device portions, including the first surface, and wherein the removing the one or more temporary blocking members is carried out through the device portion including the first surface and before other device portions are connected to the device portion including the first surface.

16. The method according to claim 12, wherein prior to the attaching the end face, the device is separated from a previously drawn fiber preform.

17. A device for connecting a fiber preform including a plurality of elongate holes extending substantially parallel to a longitudinal axis of the fiber preform to a pressure supply system, the device comprising:
    a first surface to be connected to an end face of the fiber preform where the plurality of elongate holes end;
    a second surface comprising at least two ports configured to be in fluid connection with the pressure supply system; and
    a channel system within the device connecting the plurality of elongate holes at the first surface to the at least two ports such that at least one of the plurality of elongate holes is connected to one of the at least two ports and such that at least one other of the plurality of elongate holes is connected to another one of the at least two ports,
    wherein a density of the at least two ports at the second surface is smaller than a corresponding density of the channel system at the first surface, the density being a number of ports or one or more openings of the channel system per unit area of a surface, and
    wherein the channel system at a distance from the first surface occupies a cross-sectional area that is larger than a cross-sectional area occupied by the channel system at the first surface.

18. A device for connecting a fiber preform including a plurality of elongate holes extending substantially parallel to a longitudinal axis of the fiber preform to a pressure supply system, the device comprising:
    a first surface to be connected to an end face of the fiber preform where the plurality of elongate holes end;
    a second surface comprising at least two ports configured to be in fluid connection with the pressure supply system; and
    a channel system within the device connecting the plurality of elongate holes at the first surface to the at least two ports such that at least one of the plurality of elongate holes is connected to one of the at least two ports and such that at least one other of the plurality of elongate holes is connected to another one of the at least two ports, the channel system comprising a plurality of channels that are elongate along the longitudinal axis,
    wherein a density of the at least two ports at the second surface is smaller than a corresponding density of the channel system at the first surface, the density being a number of ports or one or more openings of the channel system per unit area of a surface.

19. The device according to claim 18, wherein the second surface includes a surface portion extending substantially non-parallel to the first surface, and wherein at least one port of the at least two ports is arranged at the portion.

20. The device according to claim 18, wherein the second surface includes a surface portion substantially opposite the first surface and at least one port of the at least two ports is arranged at the portion.

* * * * *